United States Patent [19]

Meal et al.

[11] Patent Number: 4,468,069
[45] Date of Patent: Aug. 28, 1984

[54] CONTACTOR FOR IMPRESSING ELECTRICAL POTENTIAL FROM A SHAFT TO A ROLLER MOUNTED THEREON

[75] Inventors: John R. Meal; Gordon M. Wiklund, both of Naperville, Ill.

[73] Assignee: AT&T Technologies, Inc., New York, N.Y.

[21] Appl. No.: 382,274

[22] Filed: May 26, 1982

[51] Int. Cl.³ .................................................. H01R 39/00
[52] U.S. Cl. .................................... 339/6 A; 339/5 R; 339/5 A; 339/6 R; 219/471
[58] Field of Search .............. 339/5 R, 5 A, 6 R, 6 A, 339/8 R, 8 A, 5 P, 5 S, 5 L, 5 M, 5 RL, 6 RL, 8 L, 8 P, 8 PB, 8 PS, 8 RL; 219/155, 469, 471; 310/232, 248

[56] References Cited

U.S. PATENT DOCUMENTS

| | | | |
|---|---|---|---|
| 2,064,589 | 12/1936 | Convers | 339/6 A X |
| 2,248,394 | 7/1941 | Sorensen | 339/55 |
| 2,634,357 | 4/1953 | Steward | 339/55 X |
| 3,439,307 | 4/1969 | Ruscher | 339/8 R |
| 3,920,300 | 11/1975 | Kenny | 339/8 R |

FOREIGN PATENT DOCUMENTS 609476 10/1948 United Kingdom ............... 339/5 A

Primary Examiner—Eugene F. Desmond
Assistant Examiner—Steven C. Bishop
Attorney, Agent, or Firm—R. P. Miller; K. R. Bergum

[57] ABSTRACT

A stationary shaft (17) is electrically connected to a roller (18) by a contactor (31) having a first section in the form of a wire loop (32) seated in a groove (32) and a second pointed section (36,37) seated within a conical recess (38) formed in the end face of the shaft and having an apex axially aligned with the axis of the shaft. An intervening section (34) is dimensioned to resiliently bias the pointed section (36,37) into firm engagement with the apex of the conical recess to make good electrical contact with a minimum degree of friction.

14 Claims, 7 Drawing Figures

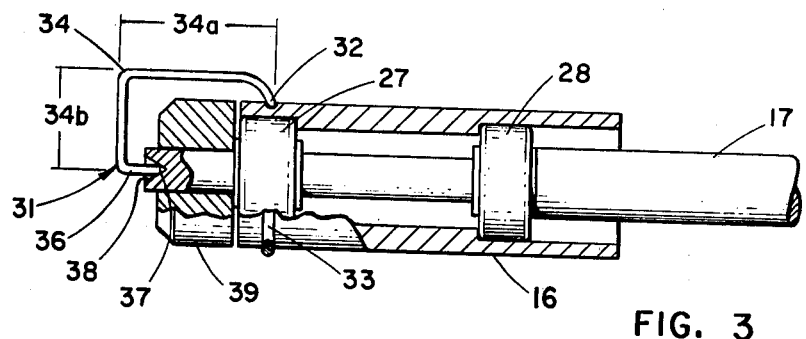
FIG. 3
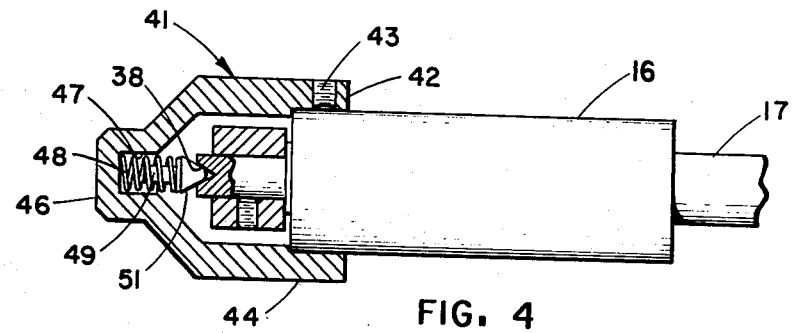
FIG. 4
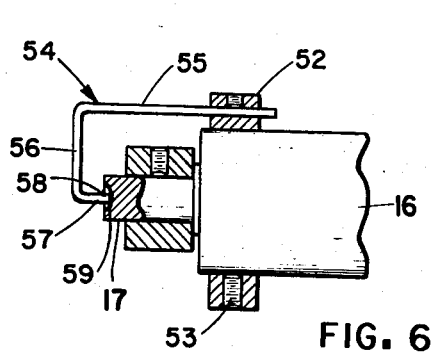
FIG. 6
FIG. 5
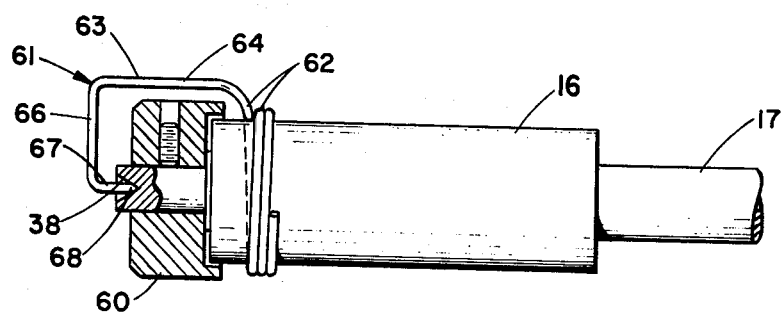
FIG. 7

CONTACTOR FOR IMPRESSING ELECTRICAL POTENTIAL FROM A SHAFT TO A ROLLER MOUNTED THEREON

FIELD OF THE INVENTION

This invention relates to a contactor for impressing electrical potential from an axial point on a stationary shaft to a conductive roller mounted thereon and, more particularly, to a contactor arrangement having a contact point axially engaging the end of the shaft and a section engulfing and contacting the periphery of the roller.

BACKGROUND OF THE INVENTION

During the processing of many types of metal and metal coated strips and the subsequent manufacture of products therefrom, it is necessary to apply an electrical potential to the moving strip or to a section thereof for the purpose of heating, charging or testing the strip. As an example, in the manufacture of rolled metallized film capacitors, an electrical potential is applied to a pair of metallized plastic films as the films are wound on a common mandrel for the purposes of monitoring the capacitance of the films during the winding operation. When the monitored value of capacitance reaches a predetermined value, the winding operation is interrupted leaving a capacitor blank with a known capacitance value.

Usually the electrical potential is applied to the films through the agency of a pair of metal rollers over which the metallized surfaces of the films pass in route to the winding mandrel. Heretofore, metallic brushes have been used wherein the brushes are mounted in a holder that is secured to the stationary shaft and biased to move the brush bristles frictionally against either the inner or outer peripheral surface of the roller.

The wear on such a brush device is rapid thus requiring frequent replacement to insure continuing good electrical contact with the roller. When the brushes are mounted within the roller and contact the inner periphery of the roller, the roller must be removed from the shaft to provide the access needed to install a replacement brush. Such an operation is time consuming resulting in significant loss of machine time. Brushes are used to engage the external surface of the roller and considerable area must be provided to insure good electrical contact. Such brushes are usually mounted in holders requiring removal of fasteners before a replacement can be made. Again, with this type of structure, the replacement operation results in considerable down time for the machine.

SUMMARY OF THE INVENTION

The present invention contemplates, among other things, a contactor structure for electrically interconnecting a shaft and a roller mounted thereon wherein a first contact section engages a minimum amount of the peripheral area of the roller, and a second section engages the end of the shaft at a point coincident with the axis of the shaft which is also the axis of rotation of the roller.

More particularly, in one embodiment, the roller is formed with a circumferential groove near one end and the face of this end is machined to provide a conical recess having an apex coaxial with the axis of the shaft. A contactor is formed from a wire having good electrical and spring characteristics. The contactor is shaped to provide a single loop with a diameter less than the base diameter of the groove. An intervening section is formed to run to a second end section of the wire which is bent to provide a pointed section directed at the axis of the shaft.

In use, the wire loop is spread and slid over the end of the roller until the loop overlies and drops into the circumferential groove. The intervening section of the wire is of such a length that the pointed end section must be flexed away from the end of the shaft so that, when released, the pointed end enters and seats at the bottom of the conical recess. With such a construction the pointed end of the contactor is resiliently held against the end of the shaft to provide a contact point that has a minimum amount of frictional contact with the shaft. The loop section of the shaft substantially surrounds the roller and thus provides a large area of electrical contact with the roller so that electrical potential may be applied from the shaft to the roller with a minimum degree of resistance loss.

DESCRIPTION OF THE DRAWINGS

Other advantages and features of the invention will be apparent upon consideration of the following detailed description when considered with the drawings, wherein:

FIG. 3 is a side view partially cut away of the structure shown in FIG. 2 and particularly showing a mounting for the roller on the shaft and the physical shape of the contactor;

FIG. 4 is a side view partially in section of a second embodiment of the invention in which a yoke-like contactor is utilized;

FIG. 5 is an end view of the contactor shown in FIG. 4;

FIG. 6 is a side view partially in section showing a third embodiment of the invention, and FIG. 7 is a side view partially in section showing another modified spring wire contactor that constitutes another embodiment of the invention.

DETAILED DESCRIPTION

Figure 1:
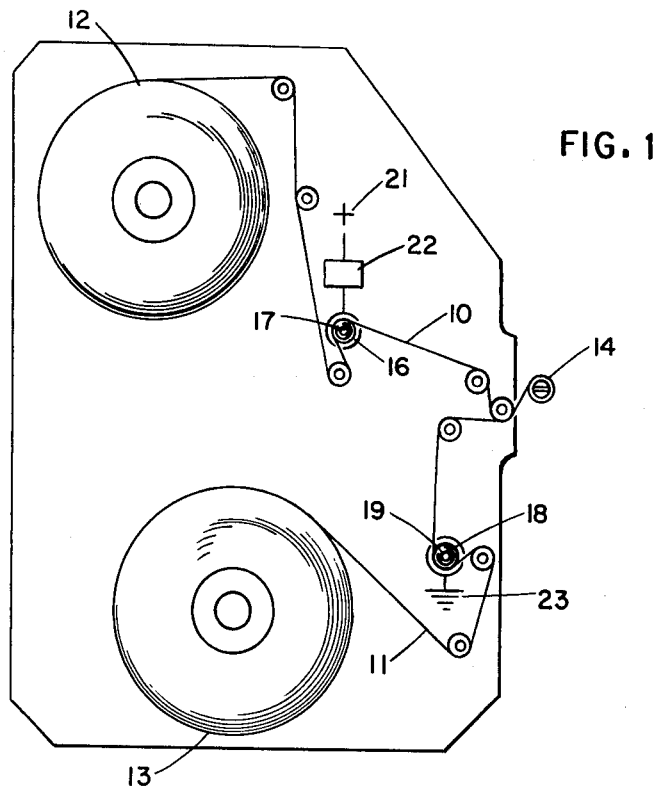
FIG. 1 is a schematic view of a side of a rolled metallized film capacitor winding machine in which metallized films are advanced over a pair of rollers that are subjected to electrical potentials by contactors constructed in accordance with the principles of the invention.

Referring to FIG. 1, there is disclosed schematically a commercial winding machine for winding simultaneously two strips 10 and 11 of metallized plastic film to form a capacitor blank. The films are advanced from a pair of supply rollers 12 and 13 onto a common mandrel 14 which is rotated to wind the films into the capacitor blank which is subsequently removed and joined to a pair of terminals to form a rolled film capacitor. During the winding the metallized film passes around a roller 16 with the metallized surface engaging the metal surface of the roller which is rotatably mounted on a shaft 17. In a like manner, the film 11 is advanced around a roller 18 which is rotatably mounted on a shaft 19.

A positive electrical potential 21 is applied through a test set 22 to the shaft 17 which, in turn, applies the potential through a contactor of the present invention to the metallized surface of the film 10. An identical special contactor is used to apply potential, such as ground potential, from a source 23 through the shaft 19 to the roller 18. As the mandrel 14 rotates the test set 22 monitors the capacitance between the wound films. When a predetermined capacitance is ascertained, the winding is interrupted and the film is severed. The capacitor blank is removed from the mandrel and provided with suitable electrical terminals to form a rolled film-type capacitor.

Figure 2:
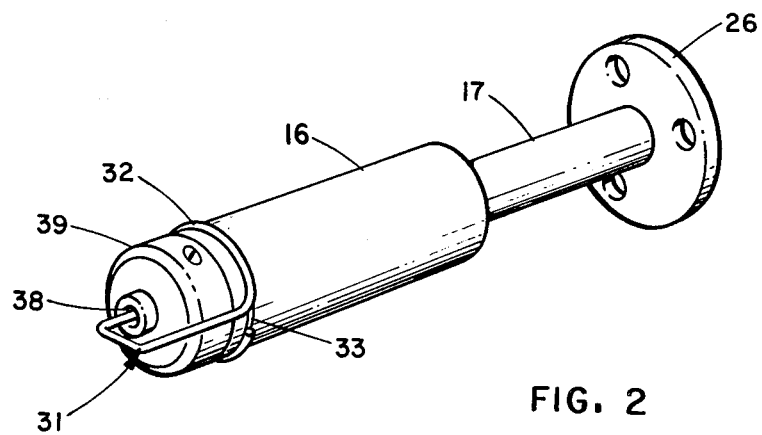
FIG. 2 is a perspective view of a first embodiment of the invention wherein a spring wire contactor applies potential from an axial point on the shaft to the periphery of the roller.

Referring to FIGS. 2 and 3 for a consideration of the first embodiment of the invention, the shaft 17 is shown attached to a flange 26 that may be secured to the frame of the machine housing. The shaft is provided with a pair of bearings 27 and 28 which may be constructed of metal or of some insulating bearing material. If the bearings 27 and 28 are constructed of metal, electrical potential, such as potential 21, may be impressed through the bearing to the roller 16. However, this bearing contact is not a good electrical contact resulting in significant resistance loss to currents flowing from the shaft through the bearing to the roller.

In order to provide a good electrical path from the shaft to the roller, a contactor 31 is provided. The contactor is constructed of a resilient wire, such as music wire, having good electrical conductivity properties as well as the property of retaining its shape for a considerable period of time when placed under stress. A first end section of the wire is formed as a wire loop or wrap 32. The roller 16 is machined with a circumferential groove 33 to receive the loop 32. The loop is shaped so as to have an internal diameter which is less than the base diameter of the groove 33. An intervening section 34 of the wire is formed to have a sub-section 34a extending parallel to the axis of the shaft 17 and a second sub-section 34b extending transversely of the axis of the shaft. A third section 36 of the wire is shaped to extend inwardly toward the shaft and is provided with a pointed end 37. The end of the shaft 17 is formed with a conical or concave recess 38 having an apex in which is seated the pointed end 37 of the wire. It will be noted that the intervening section 34 is bowed outwardly and around a hub 39 that is secured to the shaft 17.

In order to remove the contactor 31, it is only necessary to grab the bowed intervening section 34 and exert a pull which moves the loop 32 from the groove 33. In order to insert a new contactor, the loop of the new contactor is spread and slipped over the hub 39 onto the surface of the roller 16, whereupon the expanded loop 32 collapses and seats within the groove 33. The length of the intervening sub-section 34a is made to be less than the length of the third pointed section 36 plus the distance between the apex of the conical recess 38 and the groove 30. When the loop is pushed onto the roller, the pointed end 37 seats against the apex of the recess 38 so that the transverse sub-section 34b of intervening section 34 is flexed toward the left. This action serves to put a resilient bias on the end of the section 36 so as to maintain good electrical contact with the shaft 17. The contact of section 36 is along the axis of the shaft 17 and, hence, will provide a minimum of frictional drag on the rotating roller 16 which is engaged and rotated by the moving strip 10. The strip 10 is constructed of very thin material, hence, it is necessary that the free rotation of the roller 16 be not inhibited by frictional drag, such as encountered in the usual brush-type contact structure.

Referring now to FIGS. 4 and 5 for a consideration of a second embodiment of the invention, a contactor 41 is formed in the shape of a U-shaped frame or yoke having a first end section 42 engulfing the periphery of the roller 16. The end section is drawn into firm engagement with the surface of the roller by tightening a set screw 43. An intervening section 44 runs to a second section 46 which is provided with a bore 47 to receive a spring 48. Positioned within the spring is a guide rod 49 attached to a conical head 51 that is seated in the conical recess 38 of the shaft 17. The apex of the conical head 51 is axially aligned with the axis of the shaft 17. In this instance potential may be impressed through the shaft 17, the head 51, the spring 48, the intervening section 44 to the end section 42 having its internal surface firmly contacted against the peripheral surface of the end of the roller 16.

Turning now to FIG. 6, there is shown a third embodiment utilizing certain principles of the invention. In this instance, the contactor is provided with a first section in the form of a collar 52 secured about the periphery of the roller 16 by a set screw 53. A wire 54 is seated in a transverse bore formed in the collar 52 and secured to the collar by a set screw. The wire is shaped to provide an intermediate section having a longitudinally extending sub-section 55 and a radial sub-section 56 running to an inwardly projecting section 57 having a pointed end 58 seated within a concave recess 59 formed in the end face of the shaft 17. In this embodiment, when the pointed end 58 wears or the wire becomes permanently stretched and set, the set screw may be loosened and the longitudinal sub-section 55 of wire is drawn further through the bore to increase the flexing of the transverse sub-section 56 to again force the pointed end 58 into firm engagement with the apex of the concave recess.

Attention is now directed to FIG. 7 for a consideration of a fourth embodiment of the invention. A hub 60 having a diameter larger than the diameter of the roller 16 is secured to the shaft 17. The contactor 61 is shaped with a first section 62 comprising a number of loops having diameters which are less than the diameter of the roller 16. An intervening section 63 is bow-shaped to straddle the hub 60 and has a first sub-section 64 which is parallel to the axis of the shaft 17 and a second sub-section 66 which is radial with respect to the axis of the shaft 17. A third inwardly projecting section 67 is formed with a pointed end 68 to fit within the conical recess 38.

In use, the contactor 61 is grasped and the loops 62 are spread to fit over the hub 60. The intervening sub-section 66 is pressed so that the loops ride over the hub and snap onto the periphery of the roller 16. Inasmuch as there are several loops 62, the position of the contactor 61 on the roller 16 will be maintained even though the sub-section 66 may be slightly flexed to urge the contactor end section 67 into the conical recess 38 to make good electrical contact. In order to enhance the electrical contact, the pointed ends of the contactors of all four embodiments may be provided with a coating or a small glob of high electrical conductivity metal such as silver or gold.

What is claimed is:

1. A contactor for establishing a conductive path from a shaft to a roller mounted on the shaft, which comprises:
    a first contact section having a surface contacting and engulfing the periphery of the roller;

a second contact section having a free end engaging and axially aligned with the center of the shaft; and a third conductive intervening section interconnecting the first and second contact sections.

2. A contactor as defined in claim 1, wherein the second contact section is pointed and resiliently urged into engagement with the center of the end of the shaft.

3. A contactor as defined in claim 1, wherein the first, second and third sections of the contactor are constructed of wire, and the first section is formed as wraps about the periphery of the roller.

4. A contactor as defined in claim 1, wherein the first, second and third sections are constructed of wire and the third section is constructed to run from the first section parallel to the surface of the roller and then transversely to the axis of the shaft to the second section.

5. A contactor as defined in claim 1, wherein the roller is provided with a circumferential groove, and the first, second and third sections are constructed of wire, and the first section comprises a single wrap of wire seated with said groove and said wrap having a diameter less than the base diameter of the groove.

6. A contactor as defined in claim 5, wherein wire is resilient with a pointed free end forming the second section and the third intervening section is dimensioned to be flexed to force the second pointed section into engagement with the end of the shaft at a point along the axis of the shaft.

7. A contactor as defined in claim 5, wherein said shaft is formed with a conical recess on one end face, and the first, second and third sections are constructed of resilient wire and the length of the third intervening section is made less than the length of the second section plus the distance between the apex of the conical recess and the circumferential groove to urge the second pointed section into engagement with the apex of the conical recess along the axis of the shaft.

8. A contactor as defined in claim 1, wherein said first contact section comprises a collar surrounding the roller, and means for securing the collar to the periphery of the roller and said collar is formed with a transverse bore, said second section is a wire axially aligned with the axis of the shaft, and said third intervening section is a continuation of said wire extending in a radial direction beyond the periphery of the roller and in a longitudinal direction through said transverse bore; and means are provided to secure the longitudinal section of said wire to flex said radial section to urge said second section into engagement with the center of the shaft.

9. A contactor as defined in claim 8, wherein the shaft is provided with a concave recess, and the wire is pointed and urged to engage the apex of the concave recess.

10. A contactor as defined in claim 1, wherein the first, second and third sections are constructed of wire and the first section is constructed of a plurality of wraps each having a diameter less than the diameter of the roller.

11. A contactor as defined in claim 1, wherein the second section is a pointed member and the third section is a yoke having internal forward lips forming the second section which engulf and engage the periphery of the roller.

12. A contactor as defined in claim 11, which comprises:
means for securing the peripheral portions of the forward lips to the periphery of the roller; and
means interposed between the pointed member and an inner wall of the yoke to urge the pointed member against the shaft.

13. A contactor for transmitting electrical potential from a stationary conductive shaft to a conductive roller rotatably mounted thereon, which comprises:
a contactor element constructed with a first circular section encircling the roller and firmly engaging the periphery of the roller to rotate therewith, a second section having a pointed end directed at the axis of the shaft, said shaft formed with a conical recess having an apex aligned with the axis of the shaft for receiving said pointed end, a third intervening section interconnecting the first and second sections for supporting said third section with the pointed end thereof in pressing engagement with the apex of the conical recess so that the contactor rotates with the roller with a minimum amount of friction.

14. A contactor for applying potential from a stationary conductive shaft to a conductive roller rotatably mounted on the shaft, which comprises:
a contactor element constructed of a single resilient wire having a first section forming a single loop of predetermined diameter, said roller having formed adjacent one end thereof a circumferential groove for receiving said single loop, said groove having a base diameter greater than said predetermined diameter of said loop so that said loop is forcibly held within said groove to rotate with said roller, a second section of said wire formed to align with the axis of the shaft and formed with a pointed tip, said shaft having a conical recess forced therein with the apex of the recess aligned with the axis of the shaft, a third intervening section of said wire interconnecting the first and second sections of the wire and being of such length as to resiliently force the second section to press the pointed end thereof into engagement with the apex of the conical recess.

* * * * *